March 7, 1950 G. A. ERICKSON 2,500,026
FISHING LINE METER
Filed Oct. 12, 1948
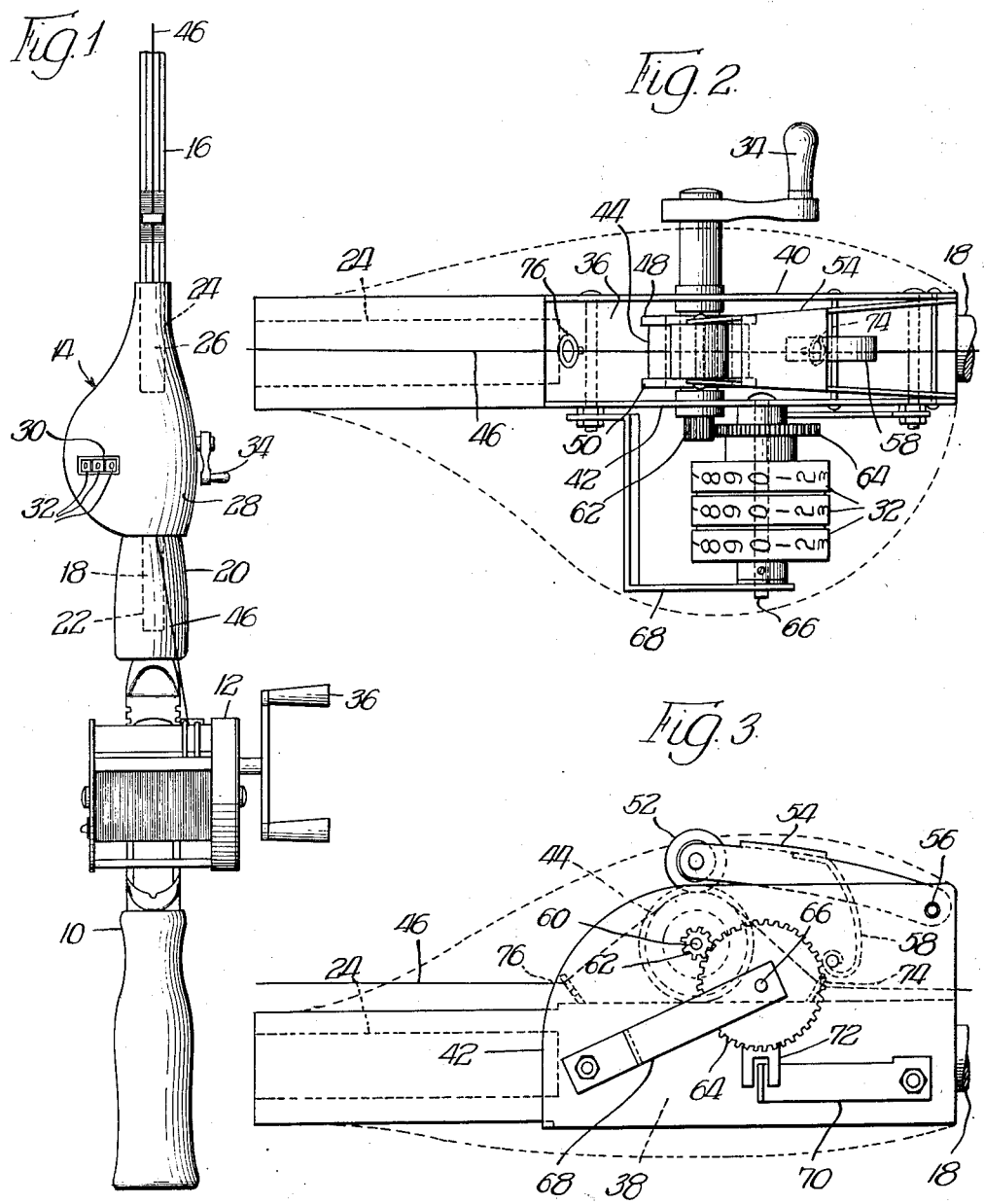
INVENTOR.
Gustav A. Erickson,
BY
Wilkinson, Huxley, Byron, & Hume
ATTYS Patented Mar. 7, 1950

2,500,026

UNITED STATES PATENT OFFICE 2,500,026

FISHING LINE METER

Gustav A. Erickson, Chicago, Ill.

Application October 12, 1948, Serial No. 54,112

5 Claims. (Cl. 33—134)

This invention relates to a fishing line meter adapted to indicate the length of line unwound from the reel.

It is often desirable to know with accuracy the amount of line which has been reeled out during particular types of fishing. In order to place the hook at a particular depth, for example, it is necessary to have some means of determining when that depth has been reached. If it is known that the best results can be obtained at a particular time at a definite depth in the water, which characteristic is commonly thought to be related to the various temperature strata which exist in any body of water, it is also necessary to have a convenient means available for repeatedly causing the hook to be returned to that same level regardless of the fact that it is drawn up to the surface intermittently.

It is, therefore, an object of this invention to provide an improved method and means for indicating the length of line unwound from a fishing reel.

It is also an object of this invention to provide an odometer for fishing lines which is of relatively simple construction and which may be inserted in a sectional fishing rod as a section thereof.

Still another object is to provide such a fishing line meter which is activated directly by longitudinal movement of the fishing line mounted in direct contact therewith, and which provides an accurate reading irrespective of the variation or change in the diameter of the convolutions of the line wound upon the spool of the reel.

Further objects and advantages of this invention will become evident as the description proceeds and from an examination of the accompanying drawing which illustrates one embodiment of the invention and in which similar numerals refer to similar parts throughout the several views.

In the drawing—

Figure 1 is a plan view of the base portion of a sectional fishing rod having a fishing line meter embodying applicant's invention inserted therein as a section thereof.

Figure 2 is an enlarged plan view of the fishing line meter embodying applicant's invention shown in Figure 1, the housing thereof being shown in dotted lines; and Figure 3 is a view in elevation of the fishing line meter shown in Figure 2.

Referring now to Figure 1, the handle portion 10 has the reel 12 mounted thereon in the recess provided for that purpose. The fishing line meter, indicated generally by the numeral 14, is inserted between the handle portion 10 and the first section 16 of the rod itself. As is indicated, the fishing line meter 14 has a male plug 18 formed at the lower end thereof, which is adapted to be received in the upper end 20 of the handle portion of the rod, which upper end has a suitable female socket 22 formed therein. Likewise, the upper end of the fishing line meter 14 has a female socket 24 formed therein which is adapted to receive the lower extremity 26 of the first section 16 of the sectional fishing rod. The meter is provided with a suitable housing 28 which has a window 30 therein which is disposed so that the individual holding the rod and operating the reel can view the direct reading numeral wheels 32 which are visible therethrough. In addition, the reset crank 34 projects from the housing 28 on the same side of the rod as the reel handle 36, and suitable openings are provided in each end of the housing to permit the fishing line to pass therethrough.

This disposition of the fishing line odometer enables the user to utilize the fishing rod in the normal fashion and yet be provided with an accurate reading as to the amount of fishing line which has been unwound from the reel in casting or otherwise. The reset crank 34 enables the user to quickly adjust the meter for any variations which may occur.

Figures 2 and 3 illustrate the construction of the meter in more detail. The meter is formed with the base member 38 secured between the two side plates 40 and 42, one end of the base member 38 being in the form of the male plug portion 18 and the opposite end having the female socket 24 formed therein. The base member with the two side plates thus forms, in effect, an additional section of rod which may be inserted at will. In other words, the male plug portion 18 is of substantially the same configuration as the plug end of the first section 16 of the sectional rod, and the female socket 24 is of substantially the same configuration as the female socket in the upper end 20 of the handle portion 10 of the rod.

Rotatably mounted between the two side plates 40 and 42 is the roller 44 against which the line 46 is adapted to bear. This roller is also provided with the two flanges 48 and 50 on each side, respectively, to aid in maintaining the line 46 in proper alignment thereon.

An idler roller 52 is carried by the arm 54, which arm is pivotally mounted between the two side plates 40 and 42 at the point 56, as best shown in Figure 3. The spring member 58, mounted between the two side plates, is adapted to normally urge the arm 54 in the direction of the roller 44 and therefore to cause the idler roller 52 to normally bear against the roller 44. Idler roller 52 has a longitudinal dimension which is substantially the same as the distance between the two flanges 48 and 50, so that it fits rather snugly in the recessed portion of the roller 44 and serves to maintain the line 46 in close association with this portion of the roller 44.

The shaft 60 upon which the roller 44 is mounted is extended beyond the side plate 42 in the form of the reset crank 34 and is also extended beyond the side plate 40 and carries the gear 62 upon the extension. The gear 62 is adapted to mesh in turn with the gear 64 which is carried by the shaft 66, which shaft is journaled in the side plate 40 at one end and at the other end in the arm 68 which is carried by the side plate 40. The gear 64 is cooperatively associated with direct reading numeral wheels which make up a counter which preferably may be of the "Veeder-Root" type. As best shown in Figure 3, the arm 70 is also provided as a stop for the tabs 72 of the counter.

To aid in maintaining the line 46 in its proper position with respect to the roller 44 and the idler roller 52, the base member 38 is provided with an upstanding guide member 74 through which the line 46 passes as it feeds from the reel to the roller 44. In addition, a similar guide member 76 is mounted on the base member 38 through which the line 46 passes as it emerges from between the idler roller 52 and the roller 44.

When the device is utilized, it is first inserted between the handle member of the rod and the first section thereof, as shown in Figure 1. The housing 28 is then removed to permit the line 46 to be threaded from the reel through the guide member 74, between the idler roller 52 and the roller 44, out through the guide member 76, and from there on up the rod in the usual manner. After properly threading the line through the device and when the tackle is in condition for use, the reset crank 34 may be operated to zero the meter and the fishing activities may then proceed in the normal manner, with the one exception that at all times the user of the rod and meter combination will have an accurate reading immediately before him as to how much line at the moment is unwound from the reel.

As indicated by the above description, the odometer has no physical connection with the reel 12, but is operated directly by contact with the line itself as it moves longitudinally up the rod. The device, therefore, lends itself to being utilized with all types of reels, and its accuracy remains unimpaired regardless of the type of equipment with which it is used. In addition, it may be quickly and easily removed from association with the fishing rod if so desired, and likewise may be just as readily put back into operative position.

The drawing and the above discussion are not intended to represent the only possible form of this invention, in regard to details of construction. Changes in form and in the proportion of parts, as well as the substitute of equivalents are contemplated, as circumstances may suggest or render expedient, without departing from the spirit or scope of this invention.

What is claimed is:

1. A fishing line meter for use with a sectional fishing rod and a reel comprising a frame member, socket members formed in said frame member permitting said member to be inserted in said rod as a section thereof, a rotatable member mounted in said frame, rotatable pressure means for normally maintaining said line in frictional engagement with said rotatable member so that longitudinal movement of said line will cause said last-named member to rotate, and a counter activated by rotation of said rotatable member.

2. A fishing line meter comprising a frame member having a female socket member formed at one end thereof adapted to receive the first section above the handle section of a sectional fishing rod and a male socket member formed at the opposite end thereof adapted to be received in the handle section of said rod, said frame member therefore being adapted to be inserted in said rod as a section thereof, and rotatable indicating means disposed on said frame member so as to be normally in frictional engagement with said fishing line, longitudinal movement of said line therefore rotating said indicating means.

3. A fishing line meter comprising a frame member, socket members formed in said frame member permitting said member to be inserted in a sectional fishing rod as a section thereof, a roller disposed on said frame so as to be in frictional engagement with said fishing line, an idler roller, spring means normally urging said idler roller into tangential association with said first-named roller, guide means for directing the fishing line between said rollers, and a counting and indicating mechanism activated by rotation of said first named roller, the latter in turn being rotated by longitudinal movement of said fishing line.

4. A fishing line meter for use with a sectional fishing rod and a reel comprising a frame member, socket members formed in said frame member permitting said member to be inserted in said rod as a section thereof, and rotatable indicating means disposed on said frame member so as to be normally in frictional engagement with said fishing line, longitudinal movement of said line therefore rotating said indicating means.

5. A fishing line meter for use with a sectional fishing rod and a reel comprising a frame member, socket members formed in said frame member permitting said member to be inserted in said rod as a section thereof, rotatable indicating means disposed on said frame so as to be frictionally engaged by said fishing line, a rotatable pressure member disposed to bear against said indicating means, and guide means disposed so as to direct said fishing line into association with said indicating means and said pressure member.

GUSTAV A. ERICKSON.

REFERENCES CITED

The following references are of record in the file of this patent:

UNITED STATES PATENTS

| Number | Name | Date |
|---|---|---|
| 2,089,031 | Macdonald | Aug. 3, 1937 |
| 2,163,402 | Mason | June 20, 1939 |
| 2,233,311 | Harne | Feb. 25, 1941 |

FOREIGN PATENTS

| Number | Country | Date |
|---|---|---|
| 44,882 | Sweden | Aug. 24, 1917 |